(12) United States Patent
Yakura

(10) Patent No.: US 8,174,575 B2
(45) Date of Patent: May 8, 2012

(54) MONITORING SYSTEM

(75) Inventor: Motohiro Yakura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 719 days.

(21) Appl. No.: 12/439,134

(22) PCT Filed: Aug. 27, 2007

(86) PCT No.: PCT/JP2007/066577
§ 371 (c)(1),
(2), (4) Date: Mar. 18, 2009

(87) PCT Pub. No.: WO2008/029658
PCT Pub. Date: Mar. 13, 2008

(65) Prior Publication Data
US 2010/0013923 A1    Jan. 21, 2010

(30) Foreign Application Priority Data

Aug. 31, 2006    (JP) ................ P2006-237028

(51) Int. Cl.
*H04N 7/18*    (2006.01)
(52) U.S. Cl. ....................... 348/143; 348/156
(58) Field of Classification Search ............. 348/143
See application file for complete search history.

(56) References Cited

U.S. PATENT DOCUMENTS

| | | | | |
|---|---|---|---|---|
| 6,104,428 A | * | 8/2000 | Lu et al. | 348/159 |
| 6,501,377 B2 | * | 12/2002 | Ebata et al. | 340/506 |
| 2003/0081121 A1 | * | 5/2003 | Kirmuss | 348/143 |
| 2005/0166240 A1 | * | 7/2005 | Kim | 725/78 |
| 2006/0098091 A1 | * | 5/2006 | Chun | 348/143 |
| 2009/0273720 A1 | * | 11/2009 | Tanaka | 348/790 |

FOREIGN PATENT DOCUMENTS

| | | |
|---|---|---|
| JP | 61-21631 A | 1/1986 |
| JP | 61-287356 A | 12/1986 |
| JP | 4-302238 A | 10/1992 |
| JP | 9-163355 A | 6/1997 |
| JP | 2003-324721 A | 11/2003 |

* cited by examiner

*Primary Examiner* — John Follansbee
*Assistant Examiner* — Anthony Mejia
(74) *Attorney, Agent, or Firm* — Birch, Stewart, Kolasch & Birch, LLP

(57) ABSTRACT

The invention relates to a monitoring system equipped with low-power-consumption camera devices. A main monitor device (15) grasps whether each monitor device (12) makes a request for sending image signals. Each camera device (13) sends a polling signal to the main monitor device (15). The main monitor device (15), in response to the polling signal, sends to a camera device (13), a second relay image-sending request signal containing a piece of identification information of a monitor device (12) requesting for sending of image signals, or no-sending-request signal for relay. The camera device (13) receives the second relay image-sending request signal or the no-sending-request signal for relay so as to grasp whether sending of image signals is required or not and the monitor device (12) requesting for sending of image signals. The camera device (13) sends the image signals to the monitor device (12) requesting for sending of image signals.

20 Claims, 9 Drawing Sheets

MONITORING SYSTEM

TECHNICAL FIELD

The present invention relates to a monitoring system, in which image information is transmitted from an image-pickup device to a display device, and then displayed thereon.

BACKGROUND ART

FIG. 9 is a block diagram showing a configuration of a radio monitoring system 1 of related art. The radio monitoring system 1 of related art includes a plurality of image monitors 2, and a plurality of TV cameras 3 disposed away from the image monitors 2. Image information of an image taken by each of the TV cameras 3 is displayed on the image monitor 2, whereby a user can grasp the image information of a remote place. Such radio monitoring system 1 includes a plurality of TV cameras 3, a plurality of secondary stations 4 provided for the TV cameras 3, respectively, a plurality of image monitors 2, and a plurality of primary stations 5 provided for the image monitors 2, respectively (see e.g. Japanese Unexamined Patent Publication JP-A 9-163355 (1997)).

The secondary stations 4 send the primary stations 5 signals for confirming whether or not sending of image signals is requested, and receive reply signals to the confirming signals. In this way, the primary station 5 to be sent image signals can be ascertained. Each of the secondary stations 4 sends image signals to the primary station 5 which has requested image signals. On receipt of image signals, the primary station 5 provides image information presented by the received image signals to the image monitor 2 thereby to make the image monitor display the image information. According to the above procedures, the particular image monitor 2 can be made to display image information presented by image signals taken by the particular TV camera 3.

However, there is a problem that the secondary stations 4 consume a larger power because the secondary stations 4 send a signal for confirming whether or not the primary stations 5 have made a request for sending of image signals for the purpose of ascertaining whether or not the primary stations 5 have made a request for sending of image signals. Further, in the case where the primary stations 5 send a signal showing whether or not they have made a request for sending of image signals out of synchronization with the secondary stations 4, the secondary stations 4 need to be kept ready to receive the signal at all times, which poses a problem that the secondary stations 4 consume a larger power.

DISCLOSURE OF INVENTION

Therefore, an object of the invention is to provide a monitoring system equipped with low-power-consumption camera devices.

The invention provides a monitoring system comprising: a camera device for producing image signals presenting image information; a plurality of monitor devices for displaying image information presented by image signals produced by the camera device; and a designator device for designating a destination monitor device to which image signals are to be sent from the camera device, wherein (a) the designator device includes:
a designator communication section being radio-communicatable;
an acquisition section for acquiring identification information corresponding to the monitor device to be sent image signals;
a designator memory section for storing the identification information acquired by the acquisition section; and
a designator control section for controlling the designator communication section, the acquisition section and the designator memory section, respectively, (b) the camera device includes:
a camera communication section being radio-communicatable;
an image-pickup section for taking an image thereby to produce image signals;
a camera memory section for storing signals received by the camera communication section; and
a camera control section for controlling the camera communication section, image-pickup section and camera memory section, respectively, and make the camera communication section send a polling signal and make the camera communication section receive a signal coming in a predetermined length of time after sending the polling signal, (c) each of the monitor devices includes:
a monitor communication section being radio-communicatable;
a display section for displaying image information presented by image signals received by the monitor communication section; and
a monitor control section for controlling the monitor communication section and display section, respectively, (d) when the designator communication section receives a polling signal sent from the camera communication section under a condition that the identification information has been stored in the designator memory section, the designator control section makes the designator communication section send an image-sending request signal containing the identification information stored in the designator memory section toward the camera communication section, (e) when the camera communication section receives the image-sending request signal sent from the designator communication section, the camera control section makes the camera memory section store the identification information contained in the received image-sending request signal, and
makes the camera communication section send image signals produced by the image-pickup section to the monitor device identified by the identification information stored in the camera memory section, and (f) when the monitor communication section receives image signals sent from the camera communication section, the monitor control section makes the display section display image information presented by the image signals.

Furthermore, in the invention, it is preferable that the monitor control section is adapted to make the monitor communication section send an action order signal for ordering an action of the camera device to the camera communication section, the camera control section makes the camera communication section send a polling signal to the monitor device identified by the identification information stored in the camera memory section at a predetermined time point of sending the polling signal for monitors, thereafter makes the camera communication section receive an action order signal supplied from the monitor communication section of the identified monitor device in a predetermined length of time, and works following an action order expressed by the action order signal.

Furthermore, in the invention, it is preferable that the monitor control section judges based on a predetermined no-sending-request condition whether or not sending of image signals is requested, when the monitor communication section receives the polling signal sent from the camera communication section, the monitor control section makes the monitor communication section send a sending request signal expressing a request for sending of image signals as the action order signal when requesting the camera device to send image information, and makes the monitor communication section send a no-sending-request signal expressing the sending of image signals being unnecessary as the action order signal when requesting the camera device not to send image information, and when the camera communication section receives the sending request signal, the camera control section makes the camera communication section send image signals produced by the image-pickup section to the monitor device specified by identification information stored in the camera memory section, and when the camera communication section receives the no-sending-request signal, the camera control section stops sending of image signals through the camera communication section.

Furthermore, in the invention, it is preferable that the monitor control section produces a producing-condition signal for specifying a condition for producing image signals based on a predetermined image-signal-producing condition, and makes the monitor communication section send the producing-condition signal as the action order signal, and the camera control section makes the image-pickup section produce image signals based on the condition specified by the producing-condition signal.

Furthermore, in the invention, it is preferable that the camera control section makes the camera communication section send the polling signal repeatedly a predetermined number of times or for a predetermined length of time until the camera communication section receives a signal produced in response to the polling signal sent to the monitor device through the camera communication section.

Furthermore, in the invention, it is preferable that the designator control section makes the designator communication section send a second no-sending-request signal expressing the sending of image signals unnecessary when the designator communication section receives the polling signal sent from the camera communication section in a condition that the identification information has not been stored in the designator memory section, the camera control section stops at least power supply to the camera communication section from a power source when the camera communication section receives the second no-sending-request signal sent from the designator communication section, and the camera control section resumes the at least power supply to the camera communication section, and makes the camera communication section send the polling signal to the designator device when a predetermined standby time has elapsed since the stop of power supply.

Furthermore, in the invention, it is preferable that the camera control section stops at least power supply to the camera communication section from the power source in the case where the camera communication section does not receive a signal which is to be launched in response to the polling signal sent to designator device, the camera control section changes the predetermined standby time from a predetermined first standby time to a predetermined second standby time longer than the predetermined first standby time in the case where the camera communication section does not receive the signal which is to be launched in response to the polling signal a predetermined number of times or for a predetermined length of time successively, and in the case where the camera communication section receives the signal which is to be launched in response to the polling signal sent to the designator device after the change changing the predetermined standby time to the second standby time, the camera control section changes the predetermined standby time from the predetermined second standby time to the predetermined first standby time.

Furthermore, in the invention, it is preferable that the predetermined standby time is set according to a time zone.

Furthermore, in the invention, it is preferable that the camera device is supplied with power from the power source composed of a battery.

Furthermore, in the invention, it is preferable that the designator device is integrated with one of the plurality of monitor devices.

BRIEF DESCRIPTION OF DRAWINGS

Other and further objects, features, and advantages of the invention will be more explicit from the following detailed description taken with reference to the drawings wherein.

BEST MODE FOR CARRYING OUT THE INVENTION

Figure 1:
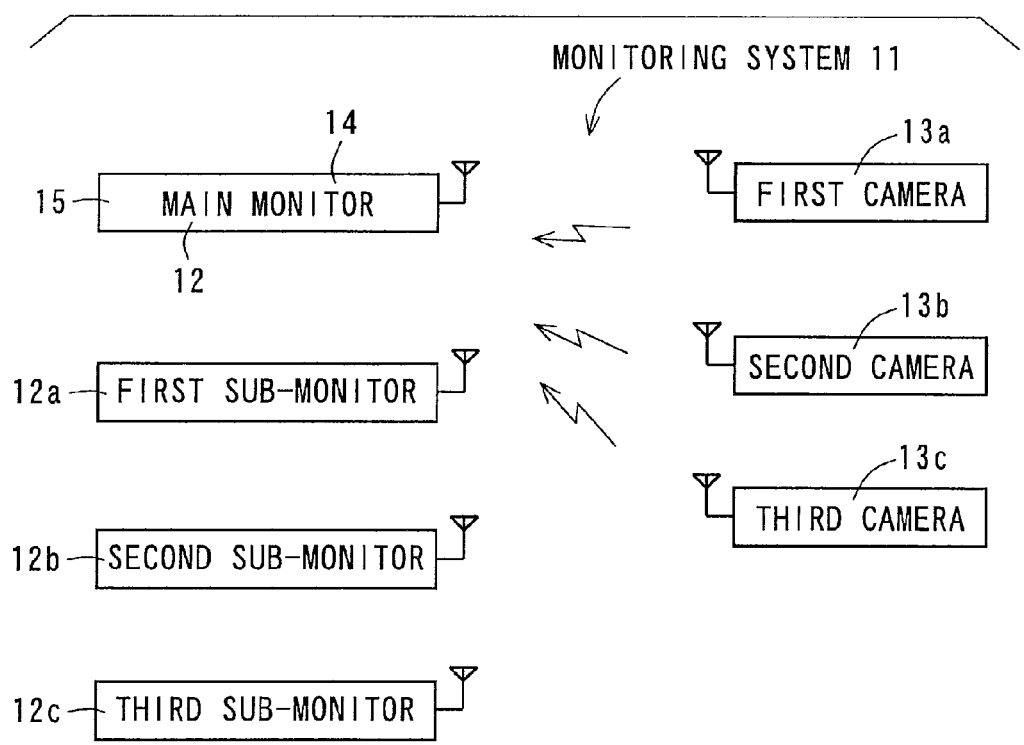
FIG. 1 is a diagram schematically showing a configuration of a monitoring system according to an embodiment of the invention.

Now referring to the drawings, preferred embodiments of the invention are described below.

FIG. 1 is a diagram schematically showing a configuration of a monitoring system 11 according to an embodiment of the invention. The monitoring system 11 is used for e.g. a system such that image signals are produced by taking an image of the outside of a room outside the door, and the image information presented by the image signals thus produced is displayed on a monitor device placed in the room. Use of the monitoring system 11 allows a user to see a visitor while staying in the room when the visitor rings a call bell.

The monitoring system 11 includes: a plurality of camera devices 13 which produce image signals presenting image information; a plurality of monitor devices 12 which display image information presented by image signals produced by the camera devices 13; and a designator device 14 which designates the destination monitor device 12 to which image signals are to be sent from each of the camera devices 13. In this embodiment, the monitoring system 11 includes four monitor devices 12 and three camera devices 13. Further, in this embodiment, one of the four monitor devices 12 is integrated with the designator device 14 to perform both operation processes of the monitor device 12 and the designator device 14. When hereinafter particularly citing the monitor device 12 which performs the operation process of the designator device 14, the monitor device shall be referred to as "main monitor device 15". The remaining three monitor devices 12, which do not perform the operation process of the designator device 14, shall be referred to as "first sub-monitor device 12a", "second sub-monitor device 12b" and "third sub-monitor device 12c", respectively. Further, the three camera devices 13 shall be referred to as "first camera device 13a", "second camera device 13b" and "third camera device 13c", respectively. When hereinafter citing unspecified one of the first to third sub-monitor devices 12a, 12b and 12c, the unspecified sub-monitor device shall be referred to as "sub-monitor device 12" simply. Further, when citing unspecified one of the main monitor device 15 and sub-monitor devices 12, the unspecified main monitor device 15/sub-monitor device shall be referred to as "monitor device 12" simply. In addition, when citing unspecified one of the first to third camera devices 13a, 13b and 13c, the unspecified camera device shall be referred to as "camera device 13" simply. The monitoring system 11 according to the embodiment displays image information taken by a certain camera device 13 of the three camera devices 13 on a certain monitor device 12 of the four monitor devices 12 according to an operation by a user.

Figure 2:
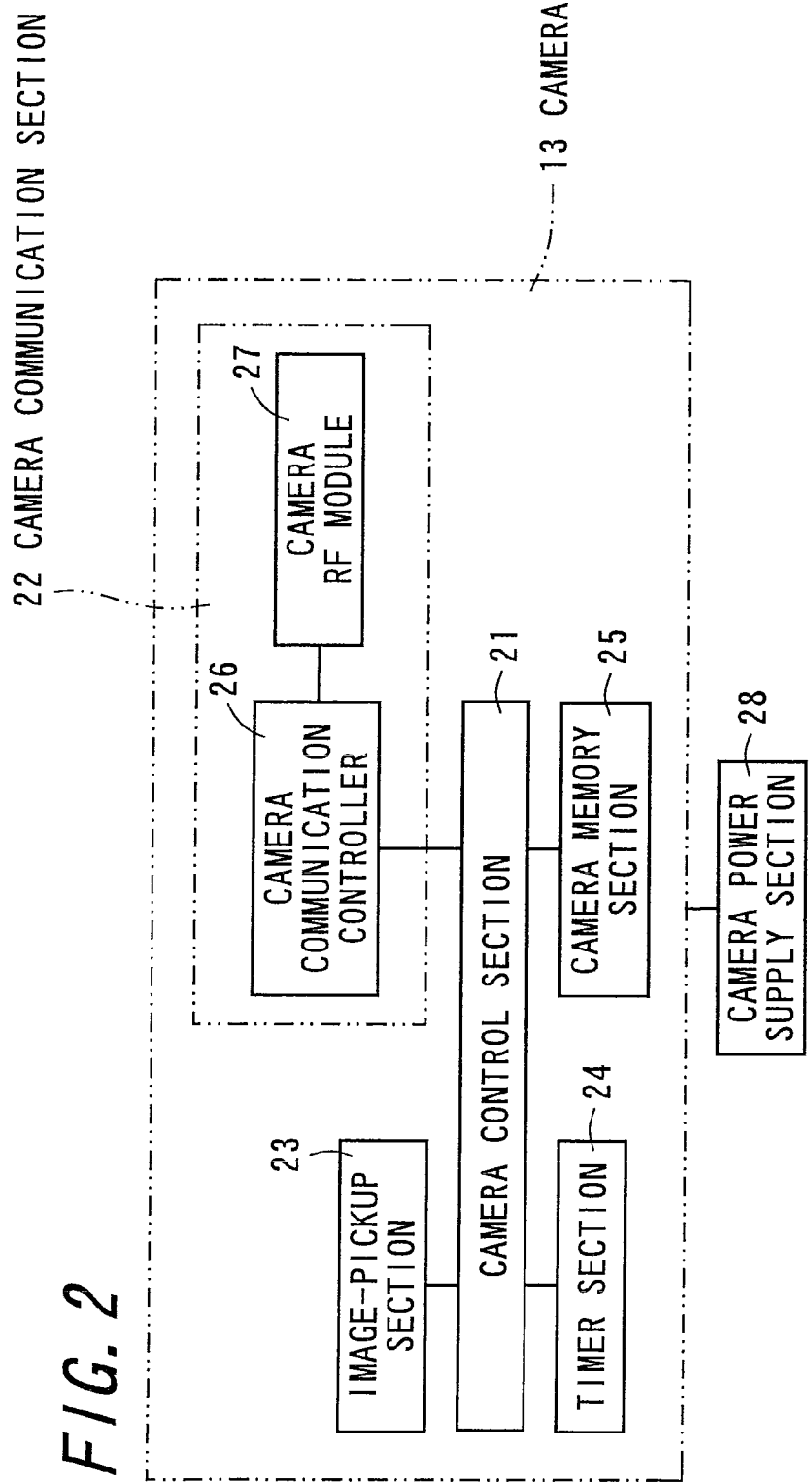
FIG. 2 is a block diagram showing an electrical configuration of a camera device.

FIG. 2 is a block diagram showing an electrical configuration of the camera device 13. For example, the camera device 13 is attached to a peephole formed on a door at an entrance; through the peephole, an image of an area targeted for image pickup outside a room is taken. Besides, the camera device 13 is provided in a room where e.g. a young child stays, and used to take an image of an area targeted for image pickup in the room. The camera device 13 provides image signals produced by taking an image to the monitor device 12 in response to a request from the monitor device 12.

The camera device 13 includes: a camera control section 21; a camera communication section 22; an image-pickup section 23; a timer section 24; and a camera memory section 25. Also, a camera power supply section 28 for supplying electric power to the camera device 13 is shown in FIG. 2. In this embodiment, the camera power supply section 28 is implemented by a battery. The camera device 13 is driven by power supplied from the battery.

The camera control section 21 runs a control program stored in the camera memory section 25 thereby to control the sections in the camera device 13 and the camera power supply section 28. Further, the camera control section 21 includes a central processing unit (abbreviated as CPU).

The camera control section 21 has control of the camera power supply section 28, and therefore controls power supply to the camera device 13. In this embodiment, the camera control section 21 controls the camera power supply section 28 so that power supplies to the image-pickup section 23, the camera communication section 22 and others are performed intermittently.

The image-pickup section 23 takes an image of an area targeted for image pickup to produce image signals presenting image information under the control of the camera control section 21. The image-pickup section 23 includes e.g. a CMOS (Complementary Metal Oxide Semiconductor) image sensor or CCD (Charge Coupled Device) image sensor. The image-pickup section 23 receives an order to specify an image pick-up condition from the camera control section 21, takes an image according to this order to produce image signals, and supplies the image signals to the camera control section 21. Then, the camera control section 21 stores the image signals in the camera memory section 25.

The timer section 24 clocks a length of time specified by the camera control section 21. At the time when the specified length of time has elapsed, the timer section 24 provides the camera control section 21 with a signal showing that the specified length of time has elapsed. The timer section 24 includes a quartz oscillator for producing a clock signal with e.g. a predetermined frequency, and a counter for counting clocks.

The camera memory section 25 stores a program which the camera control section 21 reads in, image information presented by image signals produced by the image-pickup section 23, receive information received by the camera communication section 22, identification information corresponding to each of the camera devices 13, a result of calculation performed by the camera control section 21 and the like. The camera memory section 25 includes a ROM (Read Only Memory) and a RAM (Random Access Memory), for example. In this embodiment, the camera memory section 25 stores a MAC address as a piece of identification information corresponding to each of the camera devices 13. Here, MAC is an abbreviation for "Media Access Control". While a MAC address is used as the identification information in this embodiment, the identification information is not so limited. Another kind of identification information may be used instead.

The camera communication section 22 includes a camera communication controller 26, and a camera RF (Radio Frequency) module 27. In this embodiment, the camera communication section 22 functions as an RFD (Reduced Function Device) compliant with e.g. IEEE802.15.4, which is a wireless communication standard. The camera communication controller 26 performs a process conforming to the communication standard on an electric signal representing data to be sent, which is provided from the camera control section 21, and supplies the processed signal to the camera RF module 27. Also, the camera communication controller 26 performs a process conforming to the communication standard on an electric signal received by the camera RF module 27, and supplies the processed signal to the camera control section 21. For example, the camera communication controller 26 produces electric signals representing a frame formed by adding a header containing source and destination MAC addresses and a footer containing FCS (Frame Check Sequence) to a packet of electric signals to be sent, and reads in source and destination MAC addresses from received electric signals. Conforming to the wireless communication standard as described above, the camera RF module 27 modulates electric signals representing a frame supplied from the camera communication controller 26 to send the modulated signals through an antenna, demodulates radio waves captured by the antenna, and supplies electric signals representing a received frame to the camera communication controller 26.

Figure 3:
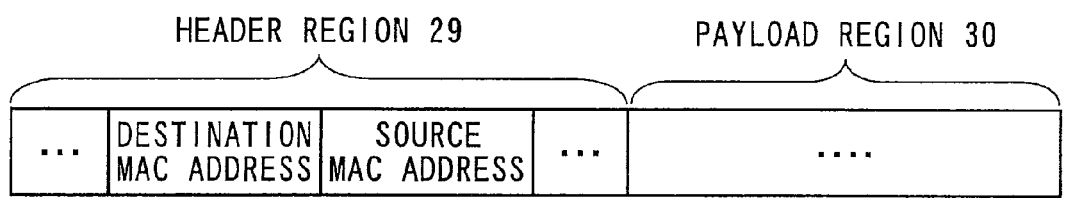
FIG. 3 is a diagram showing a data structure of a frame sent and received by a camera communication section.

FIG. 3 is a diagram showing a data structure of a frame sent and received by the camera communication section 22. The frame includes a header region 29 and a payload region 30. In the header region 29, a MAC address of a destination representing the identification information of the destination device, and a MAC address of a source representing the identification information of the source device are included. When the destination MAC address of a received frame differs from the MAC address of the camera device 13 stored in the camera memory section 25, the camera communication section 22 judges that the frame is not addressed to the camera device which the communication section belongs to, and then discards the frame in question. When the destination MAC address of a received frame agrees with the MAC address of the camera device 13 stored in the camera memory section 25, the camera communication section 22 judges that the frame is addressed to the camera device which the communication section belongs to, and then reads in data in the payload region 30. Also, the camera communication section 22 produces a frame which contains the MAC address of a device to be sent the frame as a destination MAC address. Arranging the header region 29 which contains a MAC address of a destination and a MAC address of a source in this way allows one-to-one communication in wireless communication. Thus, in the monitoring system 11 including a plurality of camera devices 13 and a plurality of monitor devices 12, communication between particular one of the camera devices 13 and particular one of the monitor devices 12 is enabled.

Figure 4:
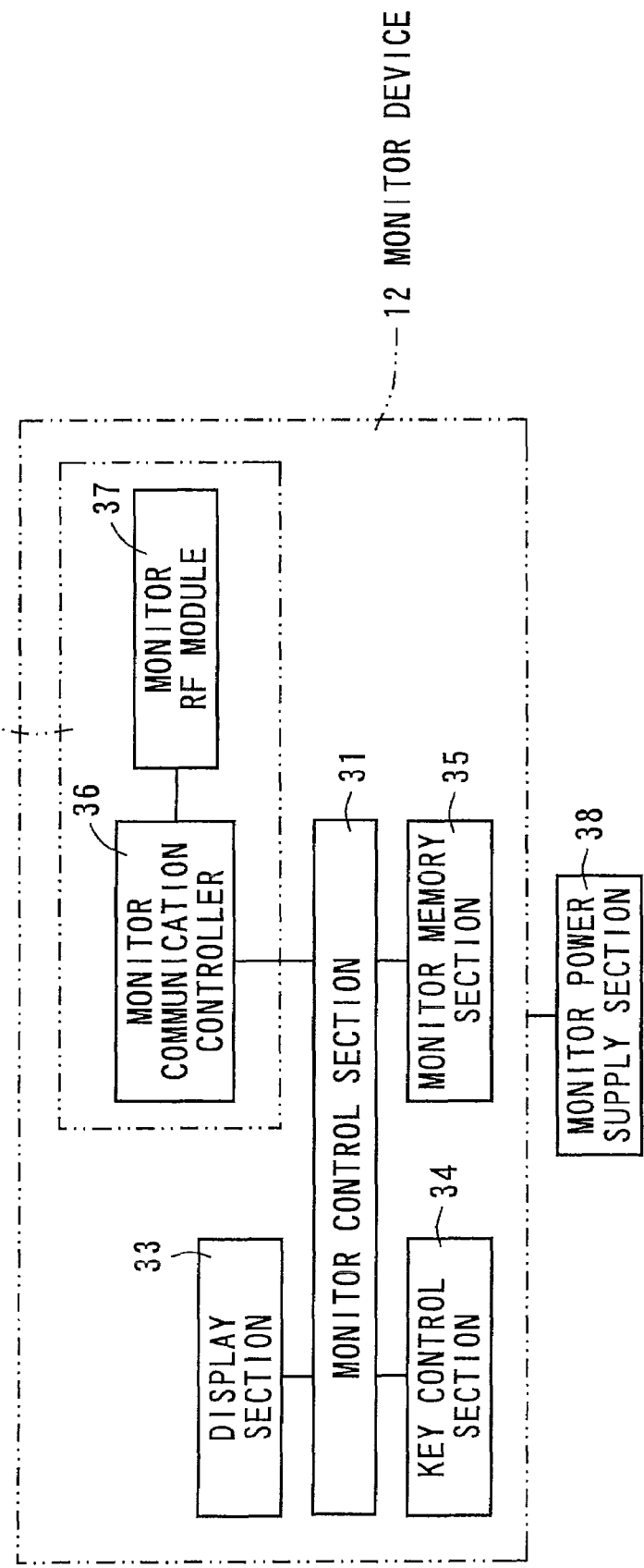
FIG. 4 is a block diagram showing an electrical configuration of a monitor device.

FIG. 4 is a block diagram showing an electrical configuration of the monitor device 12. The monitor device 12 is provided in a location, e.g. a living room, spaced apart from the camera device 13 within a range where it can communicate with the camera device 13.

The monitor device 12 includes a monitor control section 31, a monitor communication section 32, a display section 33, a key control section 34, and a monitor memory section 35. Also, a monitor power supply section 38 for supplying electric power to the monitor device 12 is shown in FIG. 4. In this embodiment, the monitor power supply section 38 is implemented by an AC power supply and an AC adaptor which are to be connected with an outlet for a commercial power supply system. The monitor device 12 is driven by electric power supplied from the commercial power supply system through the AC power supply and AC adapter. As described above, the main monitor device 15 also performs the operation process of the designator device 14. Therefore, the monitor communication section 32 of the main monitor device 15 performs the operation process of the designator communication section of the designator device 14, and the monitor control section 31 of the main monitor device 15 performs the operation process of the designator control section of the designator device 14.

The monitor control section 31 runs a control program stored in the monitor memory section 35 thereby to control the sections in the monitor device 12. The monitor control section 31 includes a CPU. In this embodiment, the monitor device 12 is supplied with power at all times. The display section 33 displays image information presented by image signals supplied from the monitor control section 31 under the control of the monitor control section 31. The display section 33 includes e.g. a liquid crystal display (abbreviated as LCD).

When a user operates a button or the like provided on the monitor device 12, the key control section 34 produces an input signal corresponding to the user operation and supplies it to the monitor control section 31. The monitor control section 31 performs control based on the input signal supplied from the key control section 34.

The monitor memory section 35 stores a program which the monitor control section 31 reads in, receive information received by the monitor communication section 32, identification information corresponding to each of the monitor devices 12, a result of calculation performed by the monitor control section 31 and the like. The monitor memory section 35 includes a ROM and a RAM, for example. In this embodiment, the monitor memory section 35 stores a MAC address as a piece of identification information.

The monitor communication section 32 includes a monitor communication controller 36, and a monitor RF module 37. In this embodiment, the monitor communication section 32 functions as an FFD (Full Function Device) compliant with IEEE802.15.4, which is a wireless communication standard. The monitor communication controller 36 performs a process conforming to the communication standard on an electric signal representing data to be sent, which is provided from the monitor control section 31, and supplies the processed signal to the monitor RF module 37. Also, the monitor communication controller 36 performs a process conforming to the communication standard on an electric signal received by the monitor RF module 37, and supplies the processed signal to the monitor control section 31. For example, the monitor communication controller 36 produces electric signals representing a frame formed by adding a header containing source and destination MAC addresses and a footer containing FCS to a packet of electric signals to be sent, and reads in source and destination MAC addresses from received electric signals. Conforming to the wireless communication standard as described above, the monitor RF module 37 modulates electric signals representing a frame supplied from the monitor communication controller 36 to send the modulated signals through an antenna, demodulates radio waves captured by the antenna, and supplies electric signals representing a received frame to the monitor communication controller 36.

Now, the procedures of communication between the monitor device 12 and camera device 13 will be described below. The camera communication section 22 functioning as an RFD can receive radio waves captured by the antenna in a predetermined length of time after sending a polling signal. Therefore, to receive a signal sent by the monitor device 12, the camera device 13 needs to send a polling signal from the camera communication section 22.

The monitor communication section 32 functioning as an FFD has a buffer memory device for previously storing a signal to be sent so as to send a signal in response to the polling signal. On receipt of the polling signal, the monitor communication section 32 sends a stored signal to the buffer memory device.

The main monitor device 15 ascertains whether or not each of the monitor devices 12 has made a request for sending of image signals. Each of the camera devices 13 is supplied with information showing the monitor device 12 having made a request for sending of image signals from the main monitor device 15, and thus ascertains the monitor device 12 to be sent image signals. In other words, a request for sending of image signals which the sub-monitor device 12 has issued is relayed by the main monitor device 15 and indirectly provided to the camera device 13.

In making a request for sending of image signals, each of the sub-monitor devices 12 decides the camera device 13 to be requested to send image signals, and sends the main monitor device 15 a first relay image-sending request signal for making a request for sending of image signals. Specifically, the payload region 30 of the frame presented by the first relay image-sending request signal contains a piece of identification information showing the camera device 13 to be requested to send image signals, and a piece of identification information showing the monitor device 12 concerned per se. A request for sending of image signals is input through the key control section 34 when a user operates e.g. a button on the monitor device 12.

When the monitor communication section 32 receives the first relay image-sending request signal, the monitor control section 31 of the main monitor device 15 identifies the sub-monitor device 12 which has made a request for sending of image signals based on the identification information showing the monitor device 12 concerned per se in the payload region 30, and identifies the camera device 13 to be sent image signals based on the identification information showing the camera device 13 contained in the payload region 30. In this way, the monitor communication section 32 of the main monitor device 15 serves as an acquisition section for acquiring a piece of identification information corresponding to the monitor device 12 to be sent image signals for each of the sub-monitor devices 12. The monitor control section 31 of the main monitor device 15 stores a second relay image-sending request signal to be sent to the identified sub-monitor device 12 in the monitor memory section 35. The second relay image-sending request signal contains a piece of identification information of the monitor device 12 which has made a request for sending of image signals. Specifically, produced and stored is the frame presented by the second relay image-sending request signal, which is so arranged that the MAC address of the identified camera device 13 is made as the MAC address of a destination in the header region 29, and the payload region 30 contains the MAC address of the sub-monitor device 12 having made a request for sending of image signals. The MAC addresses of the sub-monitor devices 12 and camera devices 13 are stored in the monitor memory section 35 of the main monitor device 15, and associated with pieces of identification information.

When an input signal for making a request for sending of image signals from a certain camera device 13 is input to the main monitor device 15 through the key control section 34 thereof, the monitor control section 31 of the main monitor device 15 produces a frame such that the MAC address of the camera device 13 which is requested to send image signals is set as the MAC address of a destination, and the MAC address of the main monitor device 15 is contained in the payload region 30, and then has the second relay image-sending request signal stored in the buffer memory device of the monitor communication section 32. As stated above, the key control section 34 of the main monitor device 15 functions as an acquisition section for acquiring a piece of identification information corresponding to the monitor device 12 to be sent image signals, for the monitor device 12 integrated with the designator device into one form.

Figure 5:
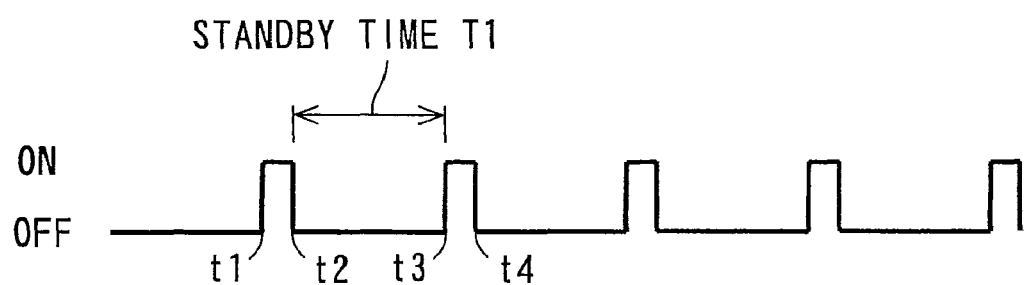
FIG. 5 is a timing chart indicating the change in power supply to the camera communication section with the passage of time in a case where the monitor device has made no request for sending of image signals to the camera device.
Figure 6:
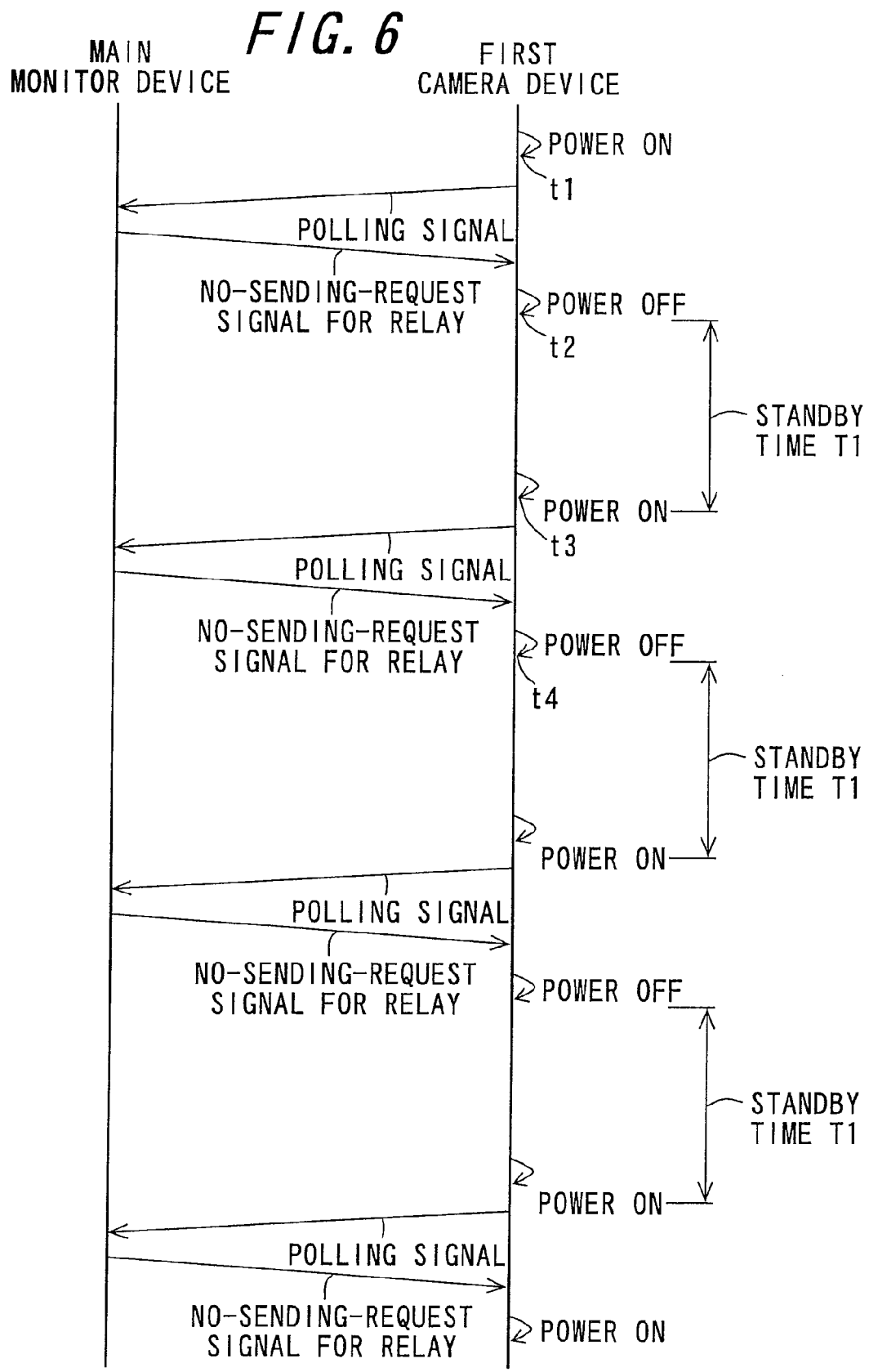
FIG. 6 is a sequence diagram when the monitor device has made no request for sending of image signals to the camera device.

FIG. 5 is a timing chart indicating the change in power supply to the camera communication section 22 with the passage of time in a case where the monitor device 12 has made no request for sending of image signals to the camera device 13. FIG. 6 is a sequence diagram when the monitor device 12 has made no request for sending of image signals to the camera device 13.

When the monitor device 12 has made no request for sending of image signals to the camera device 13, the camera control section 21 controls the camera power supply section 28 so that electric power is supplied to the camera communication section 22 intermittently. During this time, the camera control section 21 controls the camera power supply section 28 to stop power supply to a section except a portion of the camera control section 21 in charge of control of the timer section 24, a portion of the camera control section 21 in charge of control of the camera power supply section 28, the timer section 24, and the camera communication section 22 in the camera device 13. That is, when the monitor device 12 has made no request for sending of image signals to the camera device 13, the portion of the camera control section 21 in charge of control of the timer section 24, the portion of the camera control section 21 in charge of control of the camera power supply section 28, and the timer section 24 are continuously supplied with power at all time, whereas the camera communication section 22 is supplied with power intermittently.

Now, the procedure of communication between the first camera device 13a and main monitor device 15 when there is no request for sending of image signals to the first camera device 13a will be described. The second and third camera devices 13b and 13c work and perform processes in the same way as the first camera device 13a. Therefore, redundant portions in the descriptions about them are omitted here. In addition, the camera devices 13 work without synchronizing with one another. The actions of and processes by the sections of the first camera device 13a and the main monitor device 15 will be described below.

At the time t1, the camera control section 21 starts power supply from the camera power supply section 28 to the camera communication section 22. In other words, the power source of the camera communication section 22 is turned ON. When the camera communication section 22 is supplied with power, the camera control section 21 makes the camera communication section 22 send a polling signal to the main monitor device 15. The MAC address of a destination in the header region 29 of the polling signal is that of the main monitor device 15.

On receipt of the polling signal, the monitor communication section 32 of the main monitor device 15 sends a no-sending-request signal for relay because no information is stored in the buffer memory device. When the camera communication section 22 receives the no-sending-request signal for relay, the camera control section 21 judges that there isn't a request for sending of image signals to the first camera device 13a. At the time t2, the camera control section 21 stops power supply to the camera communication section 22 of the camera power supply section 28 because there is no need to send image signals. In other words, the power source of the camera communication section 22 is turned OFF at the time t2.

At the time t3 when a predetermined standby time T1 goes by since the time t2, the camera control section 21 starts power supply from the camera power supply section 28 to the camera communication section 22 based on a signal supplied from the timer section 24. In this embodiment, the predetermined standby time T1 is set to one second. When the power source of the camera communication section 22 is turned ON, the camera device 13 and monitor device 12 perform the same processes as the aforementioned ones executed from the time t1 to the time t2, respectively. Then, at the time t4, the camera control section 21 stops the camera power supply section 28 from supplying power to the camera communication section 22. Thereafter, the camera device 13 and monitor device 12 perform the processes from the time t2 to the time t4 repeatedly.

In the case where the monitor device 12 needs no sending of image signals, the power supply to the camera communication section 22 and sending of the polling signal are performed intermittently in this way. Specifically, power supply to the camera communication section 22 and sending of the polling signal are performed periodically every a little more than one second (corresponding to t3-t1 seconds). Thus, the power consumed by the camera device 13 can be saved in comparison to a case where the camera communication section 22 is supplied with electric power at all times in order to consistently keep the camera communication section ready to receive a signal. Further, when the monitor device 12 has made no request for sending of image signals, the power consumed by the camera devices 13 can be saved further. This is because power supply to a section except the portion of the camera control section 21 in charge of control of the timer section 24, the portion of the camera control section 21 in charge of control of the camera power supply section 28, the timer section 24 and the camera communication section 22 is stopped.

Figure 7:
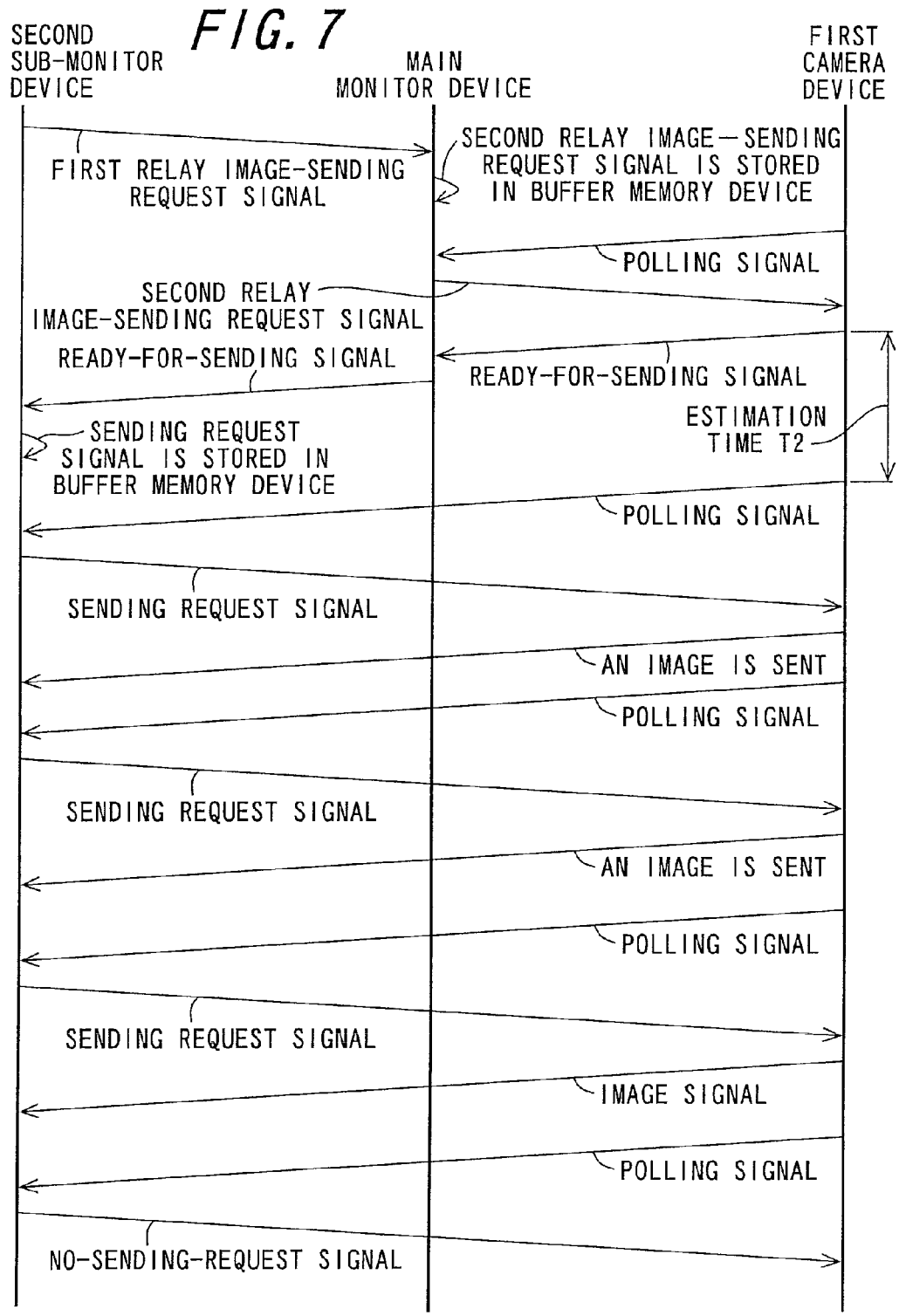
FIG. 7 is a sequence diagram showing the procedure of sending image signals from the camera device to a sub-monitor device.

FIG. 7 is a sequence diagram showing the procedure of sending image signals from the camera device 13 to the sub-monitor device 12. When a user operates a button of the second sub-monitor device 12b to perform an action for displaying image information taken by the first camera device 13a, an input signal containing a piece of information designating the first camera device 13a is supplied from the key control section 34 of the second sub-monitor device 12b to the monitor control section 31. The monitor control section 31 of the second sub-monitor device 12b makes the monitor communication section 32 send the main monitor device 15 the first relay image-sending request signal for making a request for sending of image signals produced by the first camera device 13a.

When the monitor communication section 32 receives the first relay image-sending request signal, the monitor control section 31 of the main monitor device 15 produces the second relay image-sending request signal, and stores it in the buffer memory device of the monitor communication section 32.

As stated above, the first camera device 13a sends the polling signal toward the main monitor device 15 intermittently. When the monitor communication section 32 of the main monitor device 15 receives the polling signal from the first camera device 13a, the monitor communication section 32 sends the second relay image-sending request signal stored in the buffer memory device to the first camera device 13a. The second relay image-sending request signal represents a request for image signals made by the second sub-monitor device 12b to the first camera device 13a, and in the payload region 30 thereof the MAC address of the second sub-monitor device 12b which has made a request for sending of image signals is contained as described above.

When the camera communication section 22 of the first camera device 13a receives the second relay image-sending request signal, the camera control section 21 of the first camera device 13a controls the camera power supply section 28 to start power supply to the image-pickup section 23, activates the image-pickup section 23, and makes the camera memory section 25 store the MAC address of the second sub-monitor device 12b, which is contained in the payload region 30. When image signals are produced and ready to be sent after completion of initial setting of the image-pickup section 23, the camera control section 21 of the first camera device 13a makes the camera communication section 22 send the main monitor device 15 a ready-for-sending signal showing completion of the preparation for sending image signals.

When the monitor communication section 32 of the main monitor device 15 receives the ready-for-sending signal, the monitor communication section 32 sends the ready-for-sending signal to the second sub-monitor device 12b so that the monitor communication section 32 informs the second sub-monitor device 12b that the first camera device 13a is ready to send image signals.

When the monitor communication section 32 of the second sub-monitor device 12b receives the ready-for-sending signal, the monitor communication section 32 of the second sub-monitor device 12b produces a sending request signal for making a request to the first camera device 13a for sending of image signals, and makes the buffer memory device of the monitor communication section 32 store the sending request signal. The address of a destination of the header region 29 of the sending request signal represents the MAC address of the first camera device 13a. The payload region 30 contains information representing a request for sending of image signals.

When a predetermined estimation time T2 has elapsed since the first camera device 13a has sent the ready-for-sending signal to the time, the camera control section 21 of the first camera device 13a makes the camera communication section 22 send the polling signal to the second sub-monitor device 12b. Herein, the predetermined estimation time T2 is a length of time estimated as the time that will go by until the sending request signal is stored in the buffer memory device of the second sub-monitor device 12b.

When receiving the polling signal from the first camera device 13a through the monitor communication section 32 of the second sub-monitor device 12b, the monitor communication section 32 sends the first camera device 13a the sending request signal stored in the buffer memory device as an action order signal for ordering an action of the camera device 13.

When the camera communication section 22 of the first camera device 13a receives the sending request signal, the camera control section 21 controls the image-pickup section 23 so that the image-pickup section produces image signals, and makes the camera communication section 22 send the produced image signals to the second sub-monitor device 12b identified by the MAC address stored in the camera memory section 25.

When the second sub-monitor device 12b receives image signals through the monitor communication section 32, the monitor control section 31 makes the display section 33 display the image signals.

At a time point of sending a polling signal for monitors when the camera control section 21 of the first camera device 13a completes sending of a predetermined unit of image signals, the camera control section 21 of the first camera device 13a makes the camera communication section 22 send the polling signal to the second sub-monitor device 12b. The time point of sending a polling signal for monitors refers to a point of time when sending of image signals representing an image is completed in this embodiment. In other words, when image signals representing an image are sent by the first camera device 13a, the polling signal is sent out.

When the monitor communication section 32 of the second sub-monitor device 12b receives the polling signal from the first camera device 13a, it is judged based on a predetermined no-sending-request condition whether or not to request sending of an image. When making a request for sending of image signals, the camera communication section 22 sends the sending request signal to the first camera device 13a, again. The sending request signal is stored in the buffer memory device of the camera communication section 22 in advance. The predetermined no-sending-request condition refers to whether or not a user has operated a button of the second sub-monitor device 12b thereby to input a termination signal for directing display of image information to be terminated in this embodiment. Until the termination signal is input, the second sub-monitor device 12b keeps sending the sending request signal in response to the polling signal from the first camera device 13a.

In response to the sending request signal, the first camera device 13a produces image signals again as in the above-described process and sends the image signals to the second sub-monitor device 12b, followed by sending the polling signal. The second sub-monitor device 12b sends the sending request signal in response to the polling signal as in the above-described process unless it accepts input of the termination signal. The steps of sending image signals, sending the polling signal and sending the sending request signal are repeated in this order, whereby the latest image signals are sent from the first camera device 13a to the second sub-monitor device 12b, image information is displayed on the display section 33 of the second sub-monitor device 12b while being updated in sequence.

When the termination signal for directing display of image information to be terminated is input to the second sub-monitor device 12b, the monitor control section 31 of the second sub-monitor device 12b judges that sending of image signals is unnecessary. When it is judged that sending of image signals is not required, the monitor control section 31 of the second sub-monitor device 12 stores the no-sending-request signal expressing the sending of image signals being unnecessary in the buffer memory device of the monitor communication section 32. Then, on receipt of the polling signal from the first camera device 13a, the monitor control section 31 makes the monitor communication section 32 send the no-sending-request signal as an action order signal for ordering an action of the camera device 13.

When the first camera device 13a receives the no-sending-request signal through the camera communication section 22, the camera control section 21 stops sending of image signals, and stops power supply to a section except the part of the camera control section 21 in charge of control of the timer section 24, the part of the camera control section 21 in charge of control of the camera power supply section 28, and the timer section 24 in the camera device 13.

The procedure of sending image signals from the first camera device 13a to the second sub-monitor device 12b has been described above. However, in the case where image signals are sent from the first camera device 13a to the main monitor device 15, the main monitor device 15 performs the same action and process as the second sub-monitor device 12b except the processes for sending and receiving the first image-sending request signal for relay, and the processes for sending and receiving the ready-for-sending signal from the main monitor device 15 to the second sub-monitor device 12b, whereby image signals are sent from the first camera device 13a to the main monitor device 15.

With the monitoring system 11 according to the embodiment as described above, the MAC address of the monitor device 12 is stored in the monitor memory section 35 of the main monitor device 15 as identification information corresponding to the monitor device 12 which has made a request for sending of image signals. As stated above, the main monitor device 15 grasps the monitor device 12 which has made a request for sending image signals, and therefore the camera device 13 can acquire the MAC address corresponding to the monitor device 12 which has made a request for sending of image signals by just sending the polling signal from the camera device 13 to the main monitor device 15 once. As a result, the number of times of sending the polling signal is decreased and therefore the power consumed by the camera devices 13 can be saved in comparison with the case where the monitor devices 12 are each sent the polling signal to identify the monitor device 12 which has made a request for sending of image signals as in the related art.

Further, with the monitoring system 11 according to this embodiment, the camera device 13 sends the polling signal to the monitor device 12 which has made a request for sending of image signals, whereby communication between the camera device 13 and monitor device 12 is ensured. In such condition, the monitor device 12 sends the sending request signal or no-sending-request signal as a sending-action order signal, and therefore the camera device 13 can receive the sending request signal or no-sending-request signal. As the camera control section 21 performs an action following an action order expressed by the action order signal, the monitoring system 11 in which the monitor device 12 can control the camera device 13 is implemented. Specifically, in the case where the monitor device 12 continues making a request for sending of image signals, the monitor device 12 sends the sending request signal continuously, and the camera device 13 continues sending image signals to the monitor device 12. Further, in the case where the monitor device 12 does not make a request for sending of image signals, the monitor device 12 sends the no-sending-request signal, whereby the camera device 13 is stopped from sending image signals. As a result, it becomes possible to prevent the camera device 13 from sending image signals when sending of image signals is not requested. Therefore, the power consumed by the camera devices 13 can be saved.

Still further, with the monitoring system 11 according to this embodiment, the designator device 14 is integrated with one of the plurality of monitor devices 12. Therefore, it becomes unnecessary to provide the designator device 14 separately from the monitor devices 12. Particularly, in this embodiment, one of the monitor devices 12 performs the operation process of the designator device 14, which eliminates the need for the designator device 14 as a hardware structure. Therefore, the cost of the monitoring system 11 is reduced in comparison to the case of providing the designator device 14 separately from the monitor device 12.

Also, in the monitoring system 11 according to this embodiment, the camera power supply section 28 is composed of a battery, and the camera device 13 is driven by electric power which the battery supplies. As described above, the power consumed by the camera devices 13 is low. Therefore, even when a battery is used as a power source, the intervals at which a user must replace the battery is made longer, and the convenience for users is increased.

While the camera power supply section 28 is composed of a battery in this embodiment, an AC power supply may be used instead. Even when the camera device 13 is driven by power supplied from the AC power supply, an effect that the power consumed by the camera device 13 is saved can be achieved as in the case described above.

In addition, while the designator device 14 is integrated with one of the monitor devices 12 in this embodiment, the designator device 14 may be provided separately from the monitor devices 12 in the monitoring system 11. Even in the monitoring system 11 thus arranged, the designator device 14 can grasp whether or not each of the monitor devices 12 has made a request for sending of image signals. Therefore, the camera device 13 can grasp whether or not the monitor devices 12 have made a request for sending of image signals by just sending the polling signal to the designator device 14. Hence, as in the case of integrating the designator device 14 with one of the monitor devices 12, the power consumed by the camera devices 13 can be saved.

In a monitoring system 11 according to another embodiment of the invention, the camera control section 21 keeps making the camera communication section 22 repeatedly send the polling signal a predetermined number of times or for a predetermined length of time until the camera communication section 22 receives a signal as a response to the polling signal sent by the camera communication section 22 toward the monitor device 12. As described above, in the monitor device 12, the sending request signal to be launched in response to the polling signal from the camera device 13 is stored in the buffer memory device of the camera communication section 22 in advance. As shown in FIG. 7, the camera device 13 sends the polling signal to the second sub-monitor device 12b at a time when the predetermined estimation time T2 has elapsed since having sent the ready-for-sending signal. However, before the sending request signal is stored in the buffer memory device of the second sub-monitor device 12b, the monitor communication section 32 can receive the polling signal from the first camera device 13a. When receiving the polling signal from the first camera device 13a before the sending request signal is stored in the buffer memory device, the second sub-monitor device 12b does not send the sending request signal to the first camera device 13a. In the case where the first camera device 13a receives neither sending request signal nor no-sending-request signal while having sent the polling signal, the first camera device 13a sends the polling signal to the second sub-monitor device 12b again. If the sending request signal has been stored in the buffer memory device at the time when the monitor communication section 32 of the second sub-monitor device 12b receives the polling signal, the sending request signal is sent from the second sub-monitor device 12b toward the first camera device 13a.

When signal exchange between the camera device 13 and monitor device 12 has ended in failure like this, the camera device 13 sends the polling signal thereby to try receiving the sending request signal or no-sending-request signal again. Thus, the camera device 13 can send and receive the signals further without fail and therefore, it can receive the sending request signal more reliably.

The communication between the first camera device 13a and second sub-monitor device 12b is judged to be disabled in the case where the first camera device 13a receives neither the sending request signal nor no-sending-request signal even though at the time when the predetermined estimation time T2 has elapsed since the camera communication section 22 of the first camera device 13a has sent the ready-for-sending signal, the first camera device 13a sends the polling signal to the second sub-monitor device 12b the predetermined number of times or for the predetermined length of time. In such case, the first camera device 13a will end up sending the polling signal to the second sub-monitor device 12b uselessly. Therefore, the camera control section 21 of the first camera device 13a controls the camera power supply section 28 to stop power supply to a section except the part of the camera control section 21 in charge of control of the timer section 24, the part of the camera control section 21 in charge of control of the camera power supply section 28 and the timer section 24 in the camera device 13. Thus, the camera device can be prevented from sending the polling signal to try conducting the communication when the communication with the second sub-monitor device 12b is disabled, whereby the power consumed by the camera devices 13 can be saved.

Further, in the monitoring system 11 according to another embodiment of the invention, the monitor control section 31 produces a producing-condition signal for specifying a condition for producing image signals based on a predetermined image-signal-producing condition, and makes the monitor communication section 32 send the producing-condition signal as the above-described action order signal. The camera control section 21 makes the image-pickup section 23 produce image signals based on a condition specified by the producing-condition signal.

In this embodiment, the predetermined image-signal-producing condition is input through the key control section 34 by a user operating a button of the monitor device 12. The image-signal-producing condition is e.g. a condition to specify the brightness of the image information. When the image-signal-producing condition is input, the monitor control section 31 produces a producing-condition signal for specifying the condition for producing image signals based on this condition. The producing-condition signal shows e.g. an exposure time in a case where the image-pickup section 23 takes an image. The information presented by the producing-condition signal is stored in the payload region 30 of the sending request signal sent from the monitor device 12 to the camera device 13. When the camera communication section 22 of the camera device 13 receives the sending request signal containing the producing-condition signal, the camera control section 21 makes the image-pickup section 23 produce image signals based on a condition specified by the producing-condition signal. For example, the image-pickup section 23 takes an image according to the specified exposure time, and produces image signals. Then, the image signals produced based on the condition specified by the producing-condition signal are sent from the camera device 13 to the monitor device 12. The image information presented by the image signals is displayed by the display section 33.

As the condition when the image-pickup section 23 produces image signals can be specified by the monitor device 12 in this way, image information with an image quality which a user desires can be displayed by the display section 33, and the convenience for users is improved.

Figure 8:
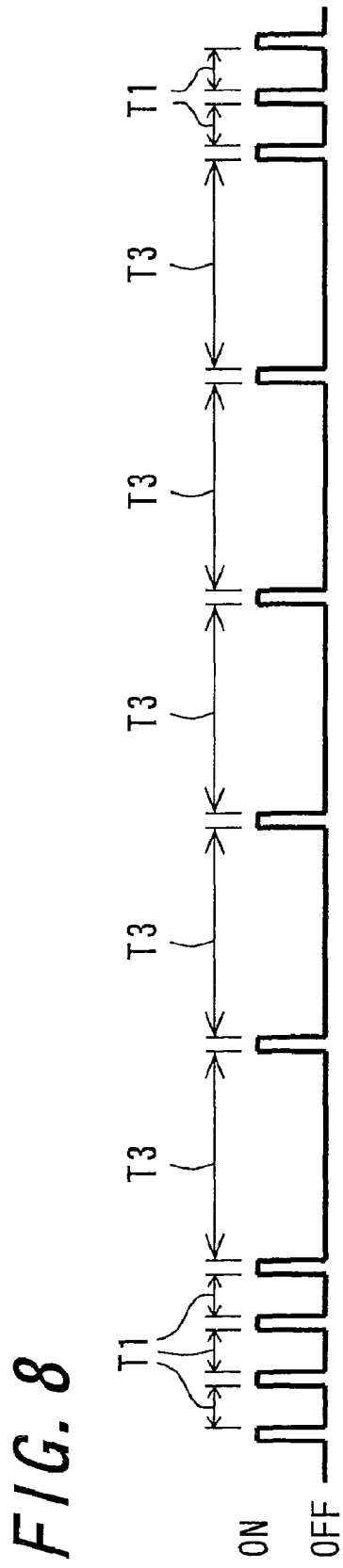
FIG. 8 is a timing chart showing the change in power supply to the camera communication section with the passage of time in the monitoring system according to another embodiment of the invention.
Figure 9:
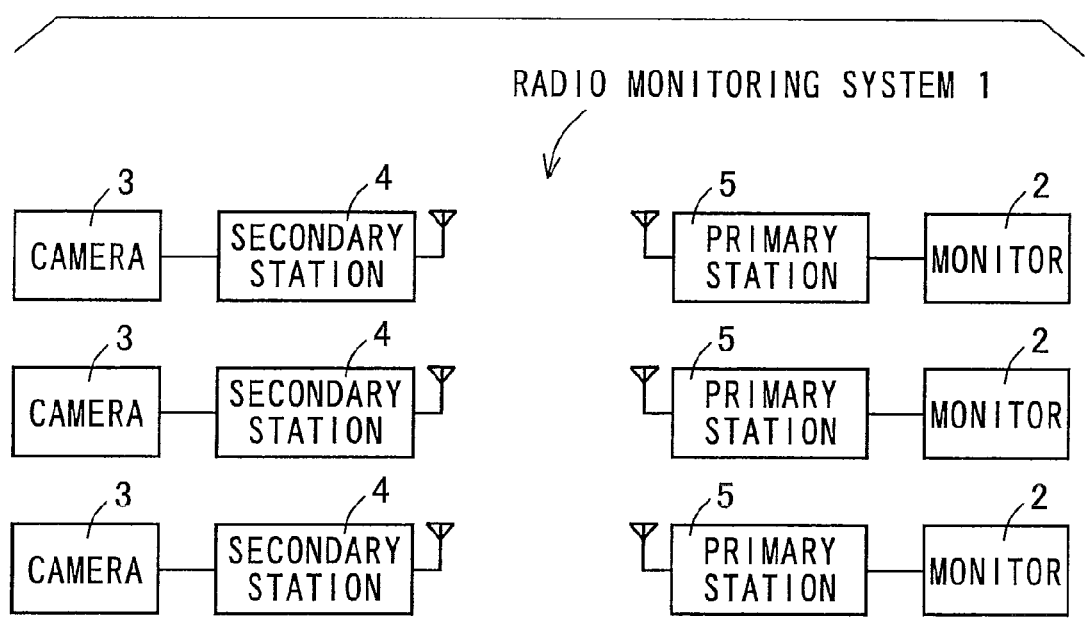
FIG. 9 is a block diagram showing a configuration of a radio monitoring system of related art.

FIG. 8 is a timing chart showing the change in power supply to the camera communication section 22 with the passage of time in the monitoring system 11 according to another embodiment of the invention.

In the monitoring system 11, the camera control section 21 judges communication between the camera device 13 and main monitor device 15 to be disabled in the case where the camera communication section 22 does not receive the signal which is to be launched in response to the polling signal sent to the main monitor device 15. The signal which is to be launched in response to the polling signal is e.g. the no-sending-request signal for relay, second relay image-sending request signal or no-sending-request signal, which is sent from the main monitor device 15. When communication between the camera device 13 and main monitor device 15 is judged to be disabled in this way, the camera control section 21 controls the camera power supply section 28 to stop power supply to a section except the part of the camera control section 21 in charge of control of the timer section 24, the part of the camera control section 21 in charge of control of the camera power supply section 28 and the timer section 24 in the camera device 13. When the predetermined standby time T1 goes by after stop of the power supply, the camera control section 21 resumes power supply to the camera communication section 22 and makes the camera communication section 22 send the polling signal to the main monitor device 15. After that, the same actions and processes as described with reference to FIGS. 5 and 6 are performed.

In the case where the camera communication section 22 does not successively receive the signal which is to be launched in response to the polling signal the predetermined number of times or for the predetermined length of time, i.e. in the case where the communication between the camera device 13 and main monitor device 15 ends in failure successively, the camera control section 21 judges communication between the camera device 13 and main monitor device 15 to be disabled. At this time, the camera control section 21 changes the predetermined standby time T1 from the predetermined first standby time T1 to a predetermined second standby time T3 longer than the predetermined first standby time T1. After that, the second standby time T3 is used as the predetermined standby time, and power supply to the camera communication section 22 and sending of the polling signal are performed intermittently.

When the camera device 13 receives the signal which is to be launched in response to the polling signal sent to the main monitor device 15 after the predetermined standby time has been changed to the second standby time T3, the camera control section 21 judges a transition for communication between the camera device 13 and main monitor device 15 to be enabled. At this time, the camera control section 21 changes the predetermined standby time from the predetermined second standby time T3 to the predetermined first standby time T1.

As described above, the time during which power supply to the camera communication section 22 is stopped is made longer in the case where it is inferred that communication between the camera device 13 and main monitor device 15 is disabled. On this account, redundant power consumption is reduced, and the number of times of uselessly sending the polling signal is reduced, whereby the power consumed by the camera communication section 22 can be reduced.

As to the monitoring system 11 according to another embodiment of the invention, the predetermined standby time is set according to a time zone in advance. In this embodiment, the predetermined standby time for a time zone that the frequency of use of the monitoring system 11 is presumed to be high is set to be shorter than the predetermined standby time for a time zone that the frequency of use of the monitoring system 11 is presumed to be low. Setting the predetermined standby time in this way makes possible to suppress uselessly sending the polling signal and to reduce redundant power supply to the camera communication section 22 in a time zone that the frequency of use is presumed to be low. As a result the power consumed by the camera devices 13 can be saved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

Industrial Applicability

According to the invention, the camera control section makes the camera communication section receive signals supplied in a predetermined length of time after sending the polling signal through the camera communication section. The camera device thus arranged communicates with the designator device or monitor device following the procedure. That is, the polling signal is sent from the camera device to the designator device or monitor device, and then the camera communication section receives a signal resulting from response to the polling signal.

The designator memory section stores identification information corresponding to the monitor device to be sent image signals, which the acquiring means has acquired. In other words, the designator device holds information about the monitor device which has made a request for sending of image signals. When receiving the polling signal, which is sent from the camera communication section, through the designator communication section under the condition where the identification information has been stored in the designator memory section, the designator control section makes the designator communication section send an image-sending request signal containing the identification information stored in the designator memory section to the camera communication section. That is, the camera control section just makes the camera communication section send the polling signal to the designator communication section. Then, the image-sending request signal containing identification information is sent through the designator communication section, and the camera communication section receives the image-sending request signal. In this way, only sending the polling signal once, the camera device can obtain identification information corresponding to the monitor device which has made a request for sending of image signals.

The camera control section makes the camera memory section store the identification information contained in the received image-sending request signal. The camera control section makes the camera communication section send image signals produced by the image-pickup section to the monitor device identified based on the identification information stored in the camera memory section, i.e. the monitor device which has made a request for sending of image signals.

When receiving image signals sent from the camera communication section through the monitor communication section, the monitor control section makes the display section display image information presented by the image signals. In this way, only sending the polling signal once from the camera device enables identification of the monitor device which has made a request for sending of image signals, and display of image information on the display section of the monitor device. Therefore, the number of times of sending the polling signal is decreased in comparison to a case where the monitor devices are sent the polling signal, respectively to identify the monitor device which has made a request for sending of an image as in the related art. The power consumed by the camera devices can be saved consequently.

According to the invention, the camera control section makes the camera communication section send the polling signal to the monitor device identified by the identification information stored in the camera memory section, i.e. the monitor device which has made a request for sending of image signals at the predetermined time point of sending a polling signal for monitors. As described above, to communicate with the monitor device, it is required for the camera device to send the polling signal to the monitor device. The polling signal is sent to the monitor device which has made a request for sending of image signals in this way, whereby communication between the camera device and the monitor device which has made a request for sending of image signals is ensured.

The monitor control section makes the monitor communication section send the action order signal for ordering an action of the camera device to the camera communication section. As the communication between the camera device and the monitor device which has made a request for sending of image signals is ensured, the camera communication section can receive the action order signal. The camera control section works following an action order expressed by the action order signal. Thus, a monitoring system such that a monitor device can control a camera device is implemented.

According to the invention, after the monitor communication section has received the polling signal, the monitor device sends a sending request signal expressing a request for sending of image signals as the action order signal when requesting the camera device to send image information, whereas the monitor device sends a no-sending-request signal expressing the sending of image signals being unnecessary as an action order signal when requesting the camera device not to send image information. Since the communication between the camera device and the monitor device which has made a request for sending of image signals is ensured as stated above, the camera communication section can receive the sending request signal or no-sending-request signal. When the camera communication section receives the sending request signal, the camera device sends image signals to the monitor device identified by the identification information stored in the camera memory section, namely the monitor device which has made a request for sending of image signals. When the camera communication section receives the no-sending-request signal, the camera device stops sending image signals. In this way, the camera device stops sending image signals according to an order from the monitor device in the case where sending of image signals has not been requested. Therefore, the camera device can be prevented from sending image signals when it is unnecessary to send image signals. Thus, the power consumed by the camera devices can be saved.

According to the invention, the monitor device sends a producing-condition signal for specifying a condition for producing image signals as the action order signal. Since the communication between the camera device and the monitor device which has made a request for sending of image signals is ensured as described above, the camera communication section can receive the producing-condition signal. When the camera communication section receives the producing-condition signal, the image-pickup section produces image signals according to the condition. The image signals thus produced are sent from the camera device to the monitor device. Hence, image information presented by image signals produced according to the condition specified by the monitor device can be displayed by the display section.

According to the invention, the camera device sends the polling signal repeatedly a predetermined number of times or for a predetermined length of time until the camera communication section receives a signal which the monitor device produces in response to the polling signal sent from the camera device through the camera communication section. When signal exchange between the camera device and monitor device ended in failure like this, the camera device sends the polling signal thereby to attempt signal exchange again. Therefore, signal exchange can be performed more reliably.

According to the invention, when receiving the polling signal through the designator communication section in the condition where the identification information has not been stored in the designator memory section, i.e. the condition where the monitor device requests no sending of image signals, the designator control section makes the designator communication section send a second no-sending-request signal expressing the sending of image signals being unnecessary. In other words, when the monitor device requested no sending of image signals, the designator device sends the second no-sending-request signal in response to the polling signal. When the camera communication section receives the second no-sending-request signal, at least power supply to the camera communication section is stopped. At the time when a predetermined standby time has elapsed since the stop of power supply to the camera communication section, at least power supply to the camera communication section is resumed, the camera device sends the polling signal. In this way, in the case where the monitor device has requested no sending of image signals, power supply to the camera communication section and sending of the polling signal are performed intermittently. Therefore, the power consumed by the camera devices can be saved in comparison to a case where the camera communication section is always supplied with power for the purpose of keeping the camera communication section ready to receive a signal at all times. Further, as the camera device sends the polling signal intermittently, the communication between the camera device and designator device is established intermittently. Therefore, when the acquisition section acquires identification information corresponding to the monitor device to be sent image signals, and the designator memory section stores the identification information, image signals are sent to the monitor device corresponding to the identification information based on the image-sending request signal sent in response to the polling signal, which is sent to the designator device intermittently.

According to the invention, in the case where the camera communication section does not receive a signal which is to be launched in response to the polling signal sent to the designator device, power supply to the camera communication section from the power source is stopped. In the case where the camera communication section does not receive the signal which is to be launched in response to the polling signal a predetermined number of times or for a predetermined length of time, namely in the case where communication between the camera device and designator device has failed successively, the predetermined standby time is changed from the predetermined first standby time to a predetermined second standby time longer than the predetermined first standby time. Thus, the time during which power supply to the camera communication section is stopped is made longer in the case where it is inferred that communication between the camera device and designator device is disabled. Therefore, redundant power consumption can be reduced, and the power consumed by the camera devices can be saved. Further, when the camera communication section receives the signal which is to be launched in response to the polling signal sent to the designator device after the predetermined standby time is changed to the second standby time, the predetermined standby time is changed from the predetermined second standby time to the predetermined first standby time because the communication between the designator device and camera device has been restored in this situation.

According to the invention, the predetermined standby time is set in advance according to a time zone. For example, when for a time zone such that the number of requests for sending of image signals from the monitor devices is presumed to be small, the predetermined standby time is set to a longer time, it is possible to avoid sending the polling signal uselessly, and therefore to avoid supplying power to the camera communication section uselessly. Thus, the power consumed by the camera devices can be saved.

According to the invention, the camera device is supplied with power from a power source composed of a battery. The power consumed by the camera devices is low as already described, and therefore the cycle of replacement of the battery by a user is longer even using a battery as the power source. Consequently, the convenience for users is improved.

According to the invention, the designator device is integrated with one of the monitor devices. Therefore, the need for providing the designator device separately from the monitor device is eliminated.

The invention claimed is:
1. A monitoring system comprising:
a camera device for producing image signals presenting image information;
a plurality of monitor devices for displaying image information presented by image signals produced by the camera device;
and a designator device for designating a destination monitor device to which image signals are to be sent from the camera device, wherein (a) the designator device includes:

a designator communication section being radio- communicatable; an acquisition section for acquiring identification information corresponding to the monitor device to be sent image signals;

a designator memory section for storing the identification information acquired by the acquisition section; and a designator control section for controlling the designator communication section, the acquisition section and the designator memory section, respectively, (b) the camera device includes:

a camera communication section being radio- communicatable;

an image-pickup section for taking an image thereby to produce image signals;

a camera memory section for storing signals received by the camera communication section; and a camera control section for controlling the camera communication section, image-pickup section and camera memory section, respectively, and make the camera communication section send a polling signal and make the camera communication section receive a signal coming in a predetermined length of time after sending the polling signal, (c) each of the monitor devices includes:

a monitor communication section being radio- communicatable;

a display section for displaying image information presented by image signals received by the monitor communication section; and a monitor control section for controlling the monitor communication section and display section, respectively, (d) when the designator communication section receives a polling signal sent from the camera communication section under a condition that the identification information has been stored in the designator memory section, the designator control section makes the designator communication section send an image-sending request signal containing the identification information stored in the designator memory section toward the camera communication section, (e) when the camera communication section receives the image-sending request signal sent from the designator communication section, the camera control section makes the camera memory section store the identification information contained in the received image-sending request signal, and makes the camera communication section send image signals produced by the image-pickup section to the monitor device identified by the identification information stored in the camera memory section, and (f) when the monitor communication section receives image signals sent from the camera communication section, the monitor control section makes the display section display image information presented by the image signals (emphasis added).

2. The monitoring system of claim 1, wherein the monitor control section is adapted to make the monitor communication section send an action order signal for ordering an action of the camera device to the camera communication section, the camera control section makes the camera communication section send a polling signal to the monitor device identified by the identification information stored in the camera memory section at a predeteu lined time point of sending the polling signal for monitors, thereafter makes the camera communication section receive an action order signal supplied from the monitor communication section of the identified monitor device in a predetermined length of time, and works following an action order expressed by the action order signal.

3. The monitoring system of claim 2, wherein the monitor control section judges based on a predetermined no-sending-request condition whether or not sending of image signals is requested, when the monitor communication section receives the polling signal sent from the camera communication section, the monitor control section makes the monitor communication section send a sending request signal expressing a request for sending of image signals as the action order signal when requesting the camera device to send image information, and makes the monitor communication section send a no-sending-request signal expressing the sending of image signals being unnecessary as the action order signal when requesting the camera device not to send image information, and when the camera communication section receives the sending request signal, the camera control section makes the camera communication section send image signals produced by the image-pickup section to the monitor device specified by identification information stored in the camera memory section, and when the camera communication section receives the no-sending-request signal, the camera control section stops sending of image signals through the camera communication section.

4. The monitoring system of claim 3, wherein the monitor control section produces a producing-condition signal for specifying a condition for producing image signals based on a predetermined image-signal-producing condition, and makes the monitor communication section send the producing-condition signal as the action order signal, and the camera control section makes the image-pickup section produce image signals based on the condition specified by the producing-condition signal.

5. The monitoring system of claim 1, wherein the camera control section makes the camera communication section send the polling signal repeatedly a predetermined number of times or for a predetermined length of time until the camera communication section receives a signal produced in response to the polling signal sent to the monitor device through the camera communication section.

6. The monitoring system of claim 1, wherein the designator control section makes the designator communication section send a second no-sending-request signal expressing the sending of image signals unnecessary when the designator communication section receives the polling signal sent from the camera communication section in a condition that the identification information has not been stored in the designator memory section, the camera control section stops at least power supply to the camera communication section from a power source when the camera communication section receives the second no-sending-request signal sent from the designator communication section, and the camera control section resumes the at least power supply to the camera communication section, and makes the camera communication section send the polling signal to the designator device when a predetermined standby time has elapsed since the stop of power supply.

7. The monitoring system of claim 6, wherein the camera control section stops at least power supply to the camera communication section from the power source in the case where the camera communication section does not receive a signal which is to be launched in response to the polling signal sent to designator device, the camera control section changes the predetermined standby time from a predetermined first standby time to a predetermined second standby time longer than the predetermined first standby time in the case where the camera communication section does not receive the signal which is to be launched in response to the polling signal a predetermined number of times or for a predetermined length of time successively, and in the case where the camera communication section receives the signal which is to be launched in response to the polling signal sent to the designator device after the change changing the predetermined standby time to the second standby time, the camera control section changes the predetermined standby time from the predetermined second standby time to the predetermined first standby time.

8. The monitoring system of claim 6, wherein the predetermined standby time is set according to a time zone.

9. The monitoring system of claim 6, wherein the camera device is supplied with power from the power source composed of a battery.

10. The monitoring system of claim 1, wherein the designator device is integrated with one of the plurality of monitor devices.

11. The monitoring system of claim 2, wherein the camera control section makes the camera communication section send the polling signal repeatedly a predetermined number of times or for a predetermined length of time until the camera communication section receives a signal produced in response to the polling signal sent to the monitor device through the camera communication section.

12. The monitoring system of claim 3, wherein the camera control section makes the camera communication section send the polling signal repeatedly a predetermined number of times or for a predetermined length of time until the camera communication section receives a signal produced in response to the polling signal sent to the monitor device through the camera communication section.

13. The monitoring system of claim 4, wherein the camera control section makes the camera communication section send the polling signal repeatedly a predetermined number of times or for a predetermined length of time until the camera communication section receives a signal produced in response to the polling signal sent to the monitor device through the camera communication section.

14. The monitoring system of claim 2, wherein the designator control section makes the designator communication section send a second no-sending-request signal expressing the sending of image signals unnecessary when the designator communication section receives the polling signal sent from the camera communication section in a condition that the identification information has not been stored in the designator memory section, the camera control section stops at least power supply to the camera communication section from a power source when the camera communication section receives the second no-sending-request signal sent from the designator communication section, and the camera control section resumes the at least power supply to the camera communication section, and makes the camera communication section send the polling signal to the designator device when a predetermined standby time has elapsed since the stop of power supply.

15. The monitoring system of claim 3, wherein the designator control section makes the designator communication section send a second no-sending-request signal expressing the sending of image signals unnecessary when the designator communication section receives the polling signal sent from the camera communication section in a condition that the identification information has not been stored in the designator memory section, the camera control section stops at least power supply to the camera communication section from a power source when the camera communication section receives the second no-sending-request signal sent from the designator communication section, and the camera control section resumes the at least power supply to the camera communication section, and makes the camera communication section send the polling signal to the designator device when a predetermined standby time has elapsed since the stop of power supply.

16. The monitoring system of claim 4, wherein the designator control section makes the designator communication section send a second no-sending-request signal expressing the sending of image signals unnecessary when the designator communication section receives the polling signal sent from the camera communication section in a condition that the identification information has not been stored in the designator memory section, the camera control section stops at least power supply to the camera communication section from a power source when the camera communication section receives the second no-sending-request signal sent from the designator communication section, and the camera control section resumes the at least power supply to the camera communication section, and makes the camera communication section send the polling signal to the designator device when a predetermined standby time has elapsed since the stop of power supply.

17. The monitoring system of claim 5, wherein the designator control section makes the designator communication section send a second no-sending-request signal expressing the sending of image signals unnecessary when the designator communication section receives the polling signal sent from the camera communication section in a condition that the identification information has not been stored in the designator memory section, the camera control section stops at least power supply to the camera communication section from a power source when the camera communication section receives the second no-sending-request signal sent from the designator communication section, and the camera control section resumes the at least power supply to the camera communication section, and makes the camera communication section send the polling signal to the designator device when a predetermined standby time has elapsed since the stop of power supply.

18. The monitoring system of claim 7, wherein the predetermined standby time is set according to a time zone.

19. The monitoring system of claim 7, wherein the camera device is supplied with power from the power source composed of a battery.

20. The monitoring system of claim 8, wherein the camera device is supplied with power from the power source composed of a battery.

* * * * *